United States Patent [19]

Goldberg

[11] Patent Number: 4,587,328
[45] Date of Patent: May 6, 1986

[54] FIRE RETARDANT WATER REPELLENT IMPREGNATING RESINS

[75] Inventor: Newton N. Goldberg, Penn Hills Twp., Westmoreland County, Pa.

[73] Assignee: Westinghouse Electric Corp., Pittsburgh, Pa.

[21] Appl. No.: 714,610

[22] Filed: Mar. 21, 1985

[51] Int. Cl.$^4$ .............................................. C08G 63/68
[52] U.S. Cl. .................................... 528/299; 428/285; 428/286; 428/287; 428/290; 428/304.4; 428/481; 428/537.1
[58] Field of Search ................. 528/299; 428/290, 285, 428/286, 287, 304, 481, 537

[56] References Cited

U.S. PATENT DOCUMENTS

| | | | |
|---|---|---|---|
| 2,801,672 | 8/1957 | Baldwin et al. | 428/246 |
| 3,171,861 | 3/1965 | Ahlbrecht | 568/842 |
| 3,493,546 | 2/1970 | Cottrill et al. | 528/299 X |
| 3,504,016 | 3/1970 | Smeltz | 528/299 X |
| 4,238,602 | 12/1980 | Griffin | 528/299 |
| 4,421,877 | 12/1983 | Alvino | 523/414 |

Primary Examiner—Lucille M. Phynes
Attorney, Agent, or Firm—D. P. Cillo

[57] ABSTRACT

A heat curable, polyester type impregnating composition is made, containing acid, and hydroxyl components containing fluorinated alcohol and non-fluorinated polyol, and where a fluorinated aliphatic alcohol having a perfluoroalkyl group from 4 carbon atoms to 12 carbon atoms constitutes from 1 wt. % to about 40 wt. % of the total fluorinated alcohol plus non-fluorinated polyol content of the composition, the composition being useful to impregnate porous tapes wrapped around electrical conductors, or to impregnate porous substrates used to make laminates, the impregnate upon cure imparting water and flame repellent characteristics.

7 Claims, No Drawings

FIRE RETARDANT WATER REPELLENT IMPREGNATING RESINS

BACKGROUND OF THE INVENTION

Fire resistant resinous compositions are well known in the art. Baldwin et al., in U.S. Pat. No. 2,801,672, for example, taught fire resistant laminating impregnants containing phenol, dicyandiamide, formaldehyde and up to 10 wt.% of refractory filler particles. Alvino, in U.S. Pat. No. 4,421,877, taught fire resistant laminating impregnants containing: epoxy resin; halogenated phenol, preferably tetrabromobisphenol A; nonionic surface active agent, such as a nonionic alkylaryl polyether alcohol; and catalyst, such as benzyldimethylamine. While all of these compositions have high temperature applications, impregnating resins also having improved water, oil and dirt repellency would be especially useful, providing the high temperature properties could be retained.

In other areas, fluorine containing compounds have been used to make organic fibrous materials oil and water resistant. Ahlbrecht, in U.S. Pat. No. 3,171,861, teaches fluorinated aliphatic alcohols containing perfluoroalkyl groups with from 3 to 12 carbon atoms as intermediates in the preparation of: perfluoroalkyl-substituted triazines, which when reacted with formaldehyde yield compounds useful as thermosetting resins exhibiting oil and water repellent characteristics; perfluoroalkyl acrylates, useful as oil and water repellent coatings for fabric or paper; and perfluoroalkyl halomethyl ethers and their quaternary amine salts, useful as soil resistant coatings for textiles, paper, leather and wood. Smeltz, in U.S. Pat. No. 3,504,016, teaches fluorinated polyesters, useful as oil and water repellent fabric coatings, where the polyesters are prepared from perfluoroalkyl-terminated, alkyl-1,3-propane diol, and a dibasic acid, such as malonic acid, succinic acid, phthalic acid, terephthalic acid, or the like, with optional addition of a nonhalogenated diol, such as ethylene glycol, tetraethylene glycol, 1,4-cyclohexanediol, or the like.

SUMMARY OF THE INVENTION

The above need has been met by co-reacting a fluorinated aliphatic alcohol having a perfluoroalkyl group of from 4 carbon atoms to 12 carbon atoms with a non-fluorine containing polyol component of a polyester (alkyd) type composition, where the term "polyol" is used throughout to mean a compound having two or more hydroxyl groups. These liquid polyesters can be made to serve as 100% solids vacuum pressure impregnants, or as solvent based or phenolic modified polyester type insulating impregnants. The fluorinated aliphatic alcohols can be co-reacted in the range of from 1 wt.% to 40 wt.% based on total weight of non-fluorinated containing polyol plus fluorinated alcohol in the impregnating composition. These polyester type compositions are water, oil and dirt repellent, and fire retardant upon cure, and are useful as impregnants in fire retardant laminates and high temperature, water resistant insulating tapes for copper or aluminum electrical coils.

DESCRIPTION OF THE PREFERRED EMBODIMENTS

The heat curable, polyester type, water, oil, dirt, and fire repellent insulating impregnants of this invention contain polyester resins having hydroxyl components containing from about 65 wt.% to about 99 wt.% fluorine-free polyol having two or more hydroxyl groups co-reacted with from 1 wt.% to 40 wt.% of a fluorinated aliphatic alcohol having a perfluoroalkyl group of from 4 carbon atoms to 12 carbon atoms.

Useful polyester type impregnants of this invention will contain at least one blend of polycarboxylic acid and polyol plus fluorine containing alcohol components, and are useful, for example, as the impregnant for high pressure cellulosic sheet laminates, and fiberglass, cloth or mica paper coil winding tapes. Useful polycarboxylic acids can include: (1) aromatic dicarboxylic acids, such as phthalic acid; terephthalic acid; isophthalic acid; and their mixtures, (2) cycloaliphatic dicarboxylic acids, such as tetrahydrophthalic acid, (3) tricarboxylic acids, such as trimellitic anhydride, (4) unsaturated aliphatic dicarboxylic acids, such as maleic acid; fumaric acid; and their mixtures, and (5) saturated aliphatic dicarboxylic acids, such as succinic acid; glutaric acid; adipic acid; pimelic acid; sebacic acid; azelaic acid; suberic acid; and the like, and their mixtures, or mixtures of these acid types. In all cases where applicable, the acid anhydride form can be used in place of the acid form, and as used herein, the term "carboxylic acid" is meant to also include carboxylic acid anhydrides.

Useful fluorine-free polyols can include: (1) diols, such as neopentyl glycol; ethylene glycol; propylene glycol; 1,3-propane diol; 1,4-butane diol; 1,2-butane diol; and the like, and their mixtures, and (2) triols, such as tris(2-hydroxyalkyl)isocyanurate, where alkyl is preferably ethyl; glycerine; pentaerythritol; inositol; trimethylolpropane; trimethylolethane; sorbitol, and the like, and their mixtures. A preferred polyol is tris(2-hydroxyethyl)isocyanurate, which provides good heat aging properties.

Useful fluorinated aliphatic alcohols are monohydric alcohols having a perfluoroalkyl group of from 4 to 12 carbon atoms. These fluorinated aliphatic monohydric alcohols can have the structural formula:

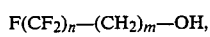

$$F(CF_2)_n-(CH_2)_m-OH,$$

where n is an integer from 4 to 12 and m is an integer from about 2 to about 12, and where $F(CF_2)_n-$ is the perfluoroalkyl group. In the preferred fluorinated aliphatic alcohols, n is an integer from 6 to 10 and m is an integer from about 2 to about 4. A mixture of these fluorinated alcohols can be used. The inclusion of this particular class of fluorinated aliphatic alcohols helps in providing water, oil, dirt, and fire retardant properties to the polyester type impregnant upon cure. In this invention a mixture of fluorine-free polyol and fluorinated aliphatic alcohol is essential.

Additionally, up to about 55 wt.%, based on polyester solids, of a phenolic resin can be added to the polyester component, such as phenol itself or resins made from the condensation of a phenol, or mixture of phenols, with an aldehyde. Phenol itself and the cresols are the most widely used phenols, while formaldehyde and furfural are the most widely used aldehydes. These resins are widely known in the art. In some instances, drying oils, including semi-drying oils, can be added to improve certain properties of the impregnant. These oils include tung oil, linseed oil, soybean oil or dehydrated castor oil, and the like and mixtures thereof.

In those instances where the impregnant is a 100% solids composition, containing polyester and a reactive diluent, such as, styrene, t-butyl styrene, vinyl toluene, methyl methacrylate, or other liquid monoethylenically saturated vinyl monomer and the like, and their mixtures; small effective amounts of catalysts, such as a peroxide, such as dicumyl peroxide, or a napththenate such as cobalt naphthenate can be used. Additionally, inhibitors, such as triethyl phosphite, hydroquinone, tertiary butyl hydroquinone, and the like, and their mixtures can also be used.

In other instances where the impregnant is a polyester type resin mixed with up to 25 wt.% of a phenolic resin, the mixture is usually solvent borne, and does not contain inhibitors. This composition can contain melamine-type materials, such as hydroxy methyl melamine, and the like, as catalysts. Useful solvents in this instance include toluene, xylene, and naphtha, with possible additions of ketones, such as methyl ethyl ketone, methyl isobutyl ketone or acetone. These solvents can be used alone but are usually used in combination with each other.

In the before-described polyester type compositions, the total non-fluorinated polyol of the polyester can be substituted for with a fluorinated aliphatic alcohol from 1 wt.% to 40 wt.%. Under 1 wt.% fluorinated alcohol, little fire retardant effect occurs. Over 40 wt.%, polymerization might be inhibited. Generally, the reactants are mixed in various sequences in a reaction kettle equipped with a stirrer, nitrogen sparge, thermometer, and a condenser, and reacted at from about 160° C. to about 225° C.

The impregnant can be applied as a dipping solution to a wide variety of porous substrates, for example, kraft paper or alpha cellulose paper, cloth such as cotton or polyethylene terephthalate (Dacron), or fiberglass. These impregnated substrates can then be dried to the "B" stage, i.e., dry and non-tacky, but not cured, and then wound or otherwise stored. These prepregs can subsequently be cut, stacked and heat and pressure laminated, at from about 100° C. to 200° C. and 1000 psi to 1500 psi, in various combinations to make consolidated, fully cured, "C"-staged laminates, useful as flame and water resistant partitions, boards, counter tops, and the like. In another process, insulating tapes, made for example of porous Dacron backed mica paper, can be wound onto copper or aluminum electrical conductors, such as motor coils, and then vacuum pressure impregnated with the polyester type impregnants of this invention, to provide a high temperature capability, water resistant coil, when the impregnant is cured to the "C" stage.

EXAMPLE 1

A 100% reactive polyester impregnating resin is made. A reaction kettle is set for straight reflux with water on the condenser. It is charged with 1010.5 pounds of tetrahydrophthalic anhydride, 1764.2 pounds of neopentyl glycol, and 120.8 pounds of a fluorinated aliphatic monohydric alcohol having the structural formula $F(CF_2)_nCH_2CH_2OH$, where n was from 4 to 12 with an average of 8, having a fluorine content of about 69.6% (sold commercially by DuPont under the trade name Zonyl BA). The reaction mixture is heated to about 150° C., and when fluid enough, the stirrer is turned on. Then, 640.5 pounds of isophthalic acid is added and the temperature maintained at 150° C. while the kettle is switched to include the decanter, and the nitrogen sparge is turned on (minimum sparge). The temperature is then raised to 175° C. and held for 1.0 hour. Then, the temperature is raised to about 200° C., and the acid value monitored until it is 20±1. The reaction mix is cooled to 150° C.; then 379.5 pounds of maleic anhydride is added, and the kettle heated to 205° C. to 210° C. This temperature is maintained until a bubble viscosity of I to J (in 60% vinyl toluene) and an acid value of about 25 is attained.

The reaction mix is then cooled to about 150° C. and the kettle returned to straight reflux. Then the following mixture of inhibitors is added: 1.6 pounds of hydroquinone, 0.5 pound of tertiary butyl hydroquinone and 12.5 pounds of triethyl phosphite. The reaction mixture is cooled to about 145° C. with continued stirring, and thinned with 3157 pounds of vinyl toluene. The solution, when cooled to 80° C. to 90° C., is then further adjusted with the addition of more vinyl toluene, until a final viscosity of V to W (about 1000 cps) is obtained. Finally, 2 pounds 5.5 ounces of 12% cobalt naphthenate catalyst is added. Of the active admixture components, polyol plus fluorinated alcohol, i.e., neopentyl glycol+Zonyl BA, constituted 41 wt.%. Of the combined polyol plus alcohol, the fluorinated aliphatic alcohol constitutes 6 wt.% and the non-fluorinated neopentyl glycol constitutes 94 wt.%.

To this 100% reactive polyester resin in vinyl toluene is added 1% of dicumyl peroxide catalyst, resulting in an impregnant with a viscosity at 25° C. of 975±100 cps. This 100% solids resin solution, when applied as an impregnant, e.g., by vacuum-pressure impregnation techniques or as a coating, e.g., by typical varnish dipping techniques, could be cured by heating at 165° C. to 175° C. for 1 to 4 hours. The cured impregnant would exhibit excellent water resistance and flame retardant properties.

EXAMPLE 2

A solvent solution of a phenolic modified polyester impregnating resin is made. A reaction kettle is set for straight reflux. It is then charged with 3658 pounds of raw linseed oil and 900 pounds of glycerine. The temperature of the reactants is raised to 200° C. and 4.5 pounds of calcium hydroxide is added. The temperature is then raised to 245° C. and the alcoholysis reaction is allowed to continue until the reaction product forms a clear solution in a 25% solution in methanol. At this point, the reaction mixture is chilled with 259 pounds of glycerine and 79 pounds of a fluorinated aliphatic monohydric alcohol having the structural formula of $F(CF_2)_nCH_2CH_2OH$, where n is from 4 to 12 with an average of 8, having a fluorine content of about 69.6% (sold commercially by DuPont under the trade name Zonyl BA). Aromatic acids and anhydride, 2362 pounds of isophthalic acid, 311 pounds of benzoic acid, and 113 pounds of phthalic anhydride, are then added and the esterification part of the reaction is allowed to proceed. Of these active admixture components, polyol plus fluorinated alcohol, i.e., glycerine+Zonyl Ba, constituted 16 wt.%. Of the combined polyol plus alcohol, the fluorinated aliphatic alcohol constitutes 6 wt.% and the nonfluorinated glycerine constitutes 94 wt.%.

The temperature of the reaction is maintained at about 200° C. to 225° C. and the water of condensation collected in the decanter. When the theorectical quantity of water is collected, heating is discontinued and the reaction mixture is cooled and then diluted with 4824 pounds of xylene to give a 60% solids solution. To this 60% solids polyester resin type solution is added a 60% solids xylene solution of a phenol-formaldehyde condensate, to provide a modified polyester impregnant. The ultimate desired properties of the blended solution determine the relative ratio of polyester to phenolic resin. Thus, if high bond strength is an important feature, then the phenolic portion of the mixture is increased to accommodate this bond strength property. Conversely, if improved flexibility is required, then the rating of resins is in favor of increased polyester content. Likewise, if speed of cure is an important feature, then the correct ratio of resins is admixed with a melamine cross-linking agent to reduce the cure time of the system.

This phenolic modified polyester impregnant, at a 50-50 ratio of 60% solids of polyester to phenolic resins, would give a xylene solution that has a viscosity of 200±100 cps at 25° C. This modified polyester impregnant can be applied to stators and coils and would exhibit a dry time of 15 to 20 minutes and a gel time of about 90 minutes at 135° C. Both oil and moisture resistance would be excellent.

I claim:

1. A heat curable polyester type impregnant composition comprising the reaction product of:
   (A) carboxylic acid component, and
   (B) hydroxyl component containing both fluorinated aliphatic monohydric alcohol and non-fluorinated polyol, where the fluorinated aliphatic monohydric alcohol has the structural formula $F(CF_2)_n-(CH_2)_m-OH$, where n is an integer from 4 to 12 and m is an integer from about 2 to about 12, and constitutes from 1 wt.% to 40 wt.% of the total fluorinated alcohol plus non-fluorinated polyol content of the impregnating composition, said composition being characterized as being water repellent and flame retardant upon cure.

2. The impregnating composition of claim 1, where, in the fluorinated alcohol structural formula, n is an integer from 6 to 10 and m is an integer from about 2 to about 4.

3. The impregnating composition of claim 1, where the fluorinated aliphatic alcohol is $F(CF_2)_nCH_2CH_2OH$, where n averages 8.

4. The impregnating composition of claim 1 consisting essentially of components (A) and (B), also containing solvent and having a solids content of from about 40 wt.% to about 75 wt.%.

5. A porous substrate impregnated with the impregnating composition of claim 1, and dried to the "B" stage, to provide a prepreg.

6. A fire retardant, water repellent laminate made from a plurality of heat and pressure consolidated prepreg substrates of claim 5.

7. An electrical conductor having porous insulating tape wound around it, said tape being impregnated with the impregnating composition of claim 1 cured to the "C" stage.

* * * * *